United States Patent [19]
Powell

[11] Patent Number: 4,684,875
[45] Date of Patent: Aug. 4, 1987

[54] POWER CONDITIONING SYSTEM AND APPARATUS

[75] Inventor: Jeffrey M. Powell, Galena, Ohio

[73] Assignee: Liebert Corporation, Columbus, Ohio

[21] Appl. No.: 856,837

[22] Filed: Apr. 28, 1986

[51] Int. Cl.⁴ .............................................. H02J 3/18
[52] U.S. Cl. .................................... 323/204; 323/214; 323/218
[58] Field of Search ............... 323/204, 206, 208, 214, 323/215, 218, 219; 363/39; 318/438, 712, 713, 714, 715, 716, 717, 718, 719

[56] References Cited
U.S. PATENT DOCUMENTS

| 4,038,589 | 7/1977 | Heyne et al. | 318/713 |
| 4,064,419 | 12/1970 | Peterson | 323/201 |
| 4,139,807 | 7/1979 | Hucker | 318/718 |
| 4,305,033 | 12/1981 | Powell | 323/306 |
| 4,460,956 | 7/1984 | Hamasaki | 363/141 |
| 4,531,085 | 7/1985 | Mesenhimer | 323/306 |

Primary Examiner—Peter S. Wong
Assistant Examiner—Judson H. Jones
Attorney, Agent, or Firm—Mueller and Smith

[57] ABSTRACT

Power conditioning apparatus exhibiting enhanced stability with respect to lagging phase angle conditions incurred in conjunction with load derived transients. The apparatus employs a synthesizer network structured having a regulator which is fashioned as a non-linear saturable transformer in parallel with a capacitor bank and which is supplied from a utility line source through input inductors. The saturable transformer components and associated capacitors form a ferroresonant circuit wherein the reactive components operate beyond the knee of a conventional magnetization curve. To develop the stiffness to suddenly lagging phase angle otherwise encountered with such synthesizers, a induction or synchronous motor is employed at the output of the regulators which operates in essentially no load fashion to create a stable output in the presence of load transient phenomena. An odd harmonic trap arrangement is provided to assure stability under severe operational conditions such as single phasing.

21 Claims, 11 Drawing Figures

POWER CONDITIONING SYSTEM AND APPARATUS

BACKGROUND

The rise in complexity and sophistication of electronically controlled devices and systems has been observed to generate a concomitant need for higher quality and very stable sources of power. This need particularly has been witnessed in connection with computer installations and more recently with respect to complex systems wherein loads are suddenly imposed upon a power supply system. The latter systems include, for example, computer aided tomography (CATSCAN) where the abrupt excitation of X-ray generation equipment is called for.

Directly supplied utility power is found to be unacceptable for increasing numbers of these sophisticated equipment installations as a consequence of line power aberrations now typically encountered. These aberrations are manifested as any of a variety of phenomena. For example, out of specification voltages referred to as "sags" are represented as a reduction in rms voltage values over a half cycle interval or more. Where such voltage reductions persist within imporant grids, they are conventionally referred to as "brown outs".

In addition to "sags" as above described, over-voltage excursions referred to as "surges" may be encountered which, in general, are manifested as deviations above nominal rms value lasting for more than a half cycle. These surges generally are encountered in conjunction with load dropping activities.

Subcycle abnormalities also are witnessed in the line power supplies. For example, high voltage, short term spikes may occur. Such excursions have been observed to be caused, inter alia, by lightning strikes or sub-station or capacitor switching by a utility.

Static noise conditions also may be encountered in the line power supplies. Such noise phenomena will include common mode noise occasioned by the operation of electrical equipment in close proximity to the source being relied upon or through load switching. Further, transverse mode noise also may be encountered appearing line-to-line and having similar causation.

When encountered within a computer room environment, the above-cataloged aberrations in line power will have a variety of effects. Line noise may result in data error, unprogrammed jumps and software/data file alterations. Momentary under- and over-voltage generally results in automatic computer power down.

Techniques which have been resorted to by industry in accommodating unreliable power supplies have involved a variety of technical approaches. One such approach looks to the use of regulators, spike suppressors, and the like which function to modify or control the input waveform. Generally, such corrective measures are insufficient in the treatment of adverse line conditions. Regulators, for example, incorporate feedback loops resulting in a slow corrective performance considered inadequate for most applications.

Another utility interactive line conditioner technique has been to employ a generator which is driven by a motor, in turn, powered from the line power supply. For the most part, these generators are driven by induction motors which often are characterized in not achieving sufficiently accurate drive output such that the driven generator will provide adequate frequency performance. Motor-generator drives also have been found to be susceptible to output instabilities when subjected to third harmonic phenomena and the like induced, for example, by load induced shocks or single phasing conditions. The latter conditions occur, for instance, with the occasion of broken lines at the input. It is most desirable to retain a capability for maintaining a quality, sinusoid output even under conditions of extreme unbalance.

Over the recent past, line power conditioners which are structured as polyphase, ferroresonant voltage synthesizers have been successfully introduced to the marketplace. In their elementary form, such synthesizers comprise a regulator which is fashioned as a non-linear saturable transformer in parallel with a capacitor bank and which is supplied from the line source through input inductors. These saturable transformer components and associated capacitors form a ferroresonant circuit wherein the reactive components operate beyond the knee of a conventional magnetization curve. One such improved synthesizer is described in U.S. Pat. No. 4,305,033 by Jeffrey M. Powell assigned in common herewith. The latter synthesizer achieves a highly reliable and stable sinusoid output through the incorporation therewith of odd and even harmonic traps. These traps function only in the presence of transients imposed upon the system to assure stability. Such synthesizers enjoy the advantage of economic construction and efficient performance while remaining immune from adverse characteristics related to stability and reliability which previously had been associated with resonating circuits.

Important improvements in terms of efficiency of operation are achieved with a further improved synthesizer described in U.S. Pat. No. 4,544,877, by Jeffrey M. Powell assigned in common herewith. These efficiencies are achieved by the select location of the capacitors associated with the ferroresonant circuit of a the regulator components of the synthesizer. Additionally, further efficiencies are achieved through a unique design of the input inductor structure.

Where load transients are imposed upon synthesizers, for example, during start-up or the like, the resultant current demands are accommodated for by a rapid adjustment of phase angle toward a lag orientation. This condition obtains until the start-up is accomplished. For some specialized applications requiring a high quality sinusoid output during any first half cycle of start-up demand, for example as seen with some X-ray generators, a stiffened source is desired. Ideally, the utility interactive device used for this type demanding purpose will achieve the highly stable sinusoidal output in the presence of transients generated at the load which is being supplied.

SUMMARY

The present invention is addressed to a utility interactive power conditioning system and apparatus which achieves a highly stable performance under severe load transient conditions. This stable performance is developed through the employment of an inductively powered rotary machine configured, in one embodiment, as a synchronous motor with a voltage synthesizer structure of the type including a regulator which is fashioned as a non-linear saturable transformer in parallel with a capacitor bank and which is supplied from a utility line source through input inductors. Operating in parallel with the synthesizer reactor components, the motor functions to provide a momentum induced output stiffness to rapid phase angle lag conditions normally associated with load transients. This performance of the motor permits the elimination of components otherwise employed with such synthesizer structures, for example, traps to the second harmonic as well as zig-zag coupled transformers otherwise used for the purpose of developing a neutral terminal. Thus, the incorporation of the motor with the synthesizer design serves to create a more transient stable regulator function which remains cost effective.

Another feature of the invention is to provide apparatus for use with a polyphase a.c. source of variable voltage level for providing a regulated a.c. output to a load which includes an input choke arrangement connectable with the a.c. source for deriving an energy input substantially immune from variations of waveshape and voltage level. Further, the apparatus includes a regulator for receiving the energy input including a polyphase saturable reactor and polyphase capacitor structure operable to synthesize a polyphase sinusoidal output which is connectable with a load. This regulator performs in conjunction with a polyphase motor having a stator coupled with the output of the apparatus for deriving a stator field and a rotor. The motor is controllable to inertially impose a phase shift stability over the sinusoidal output of the apparatus by deriving an inertially driven generator voltage source performance exhibiting phase lag with respect to the a.c. polyphase source in the presence of load transients. The apparatus further includes a control for effecting the motor control for operation continuously at minimum level power input.

Another feature of the invention is to provide, for regulator apparatus of the type wherein polyphase input chokes having non-linear impedance characteristics transfer energy from an a.c. source of variable voltage level and waveshape to a regulator including polyphase saturable reactors operating in conjunction with polyphase capacitors to synthesize a polyphase sinusoidal output, the improvement for inertially imposing a phase shift stability over the sinusoidal output which comprises a polyphase induction or synchronous motor having a stator coupled with the output for deriving a stator field, a rotor excitable by a select excitation current in the synchronous case to derive a rotor field and a starting circuit actuable for shorting the rotor field, the motor having an output carrying substantially no load and the apparatus further including a control for providing the excitation current.

Other objects of the invention will, in part, be obvious and will, in part, appear hereinafter. The invention, accordingly, comprises the system and apparatus possessing the construction, combination of elements, and arrangement of parts which are exemplified in the following detailed description.

For a fuller understanding of the nature and objects of the invention, reference should be had to the following detailed description taken in connection with the accompanying drawings.

DETAILED DESCRIPTION

Figure 1:
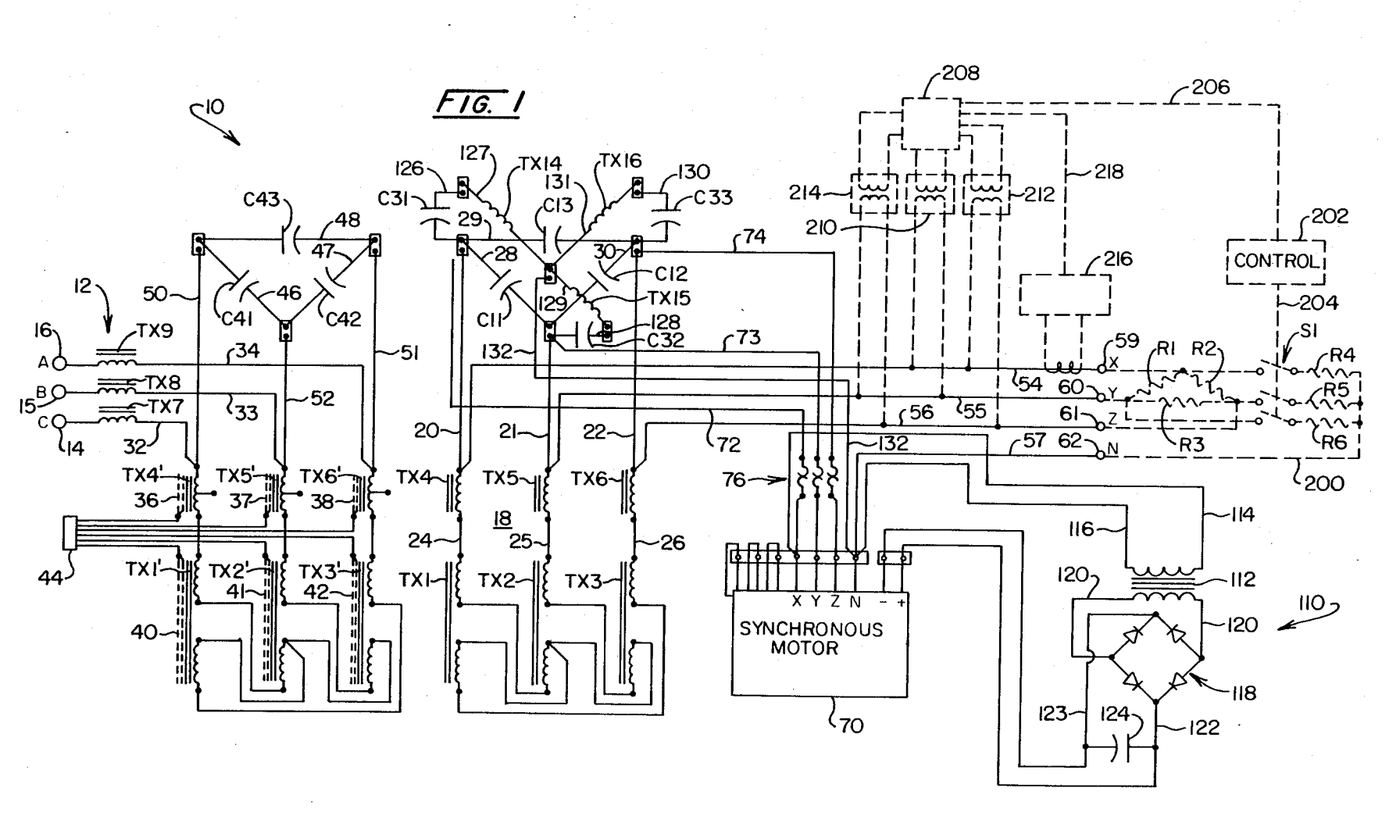
FIG. 1 is a schematic drawing of a circuit incorporating features of the invention as well as showing a test arrangement therefor.

Referring to FIG. 1, the components of a polyphase ferroresonant voltage stabilizer or power conditioning apparatus are represented generally at 10. Such devices as at 10 are particularly suited as utility interactive synthesizers which are used with loads of a variety which tend to induce transients. In this regard, the apparatus employs inductively powered rotary machine, for example, performing as a synchronous motor. However, the machine serves as an inertial voltage source in the presence of short duration load transients. For example, the power conditioning apparatus 10 is capable of accommodating load shocks as are exhibited by some X-ray systems and the like. Output stability is exhibited by this voltage-second regulating apparatus as early as that initial half cycle which follows the imposition of a load surge. Because the synchronous device responds as a heavy load upon the synthesizing or regulator components of the apparatus 10 during start-up, a requirement for second harmonic traps as has been recognized heretofore is eliminated. Further, a neutral defining zig-zag coupled transformer normally employed with the synthesizer may be replaced by the neutral terminal of the rotary machine. Accordingly, the economic viability of the apparatus 10 remains intact even though an inductively powered machine is added to its design.

The circuit of apparatus 10 is similar to that described in the above referenced U.S. Pat. No. 4,544,877 and, thus, retains the highly efficient features of that utility interactive synthesizer.

FIG. 1 reveals an input side of the power conditioning apparatus at 12 having three phase input lines 14–16 which are additionally, respectively, labelled having phases A, B, and C. Lines 14–16 are coupled to a conventional utility derived polyphase power supply for example, exhibiting 480 volts and which represent the line input to the regulating features of the system. Lines 14–16 extend, in turn, to three respective input chokes or inductors TX7, TX8, and TX9. These input chokes preferably are configured having a varying gap core structure which minimizes losses occasioned by fringing and asserts a substantial impedance at levels of load extending from low values to full load conditions while effecting diminishing impedance to the a.c. source input for overload conditions. As such, the input chokes have a capability to effect the conveyance of transient load start-up currents while providing stable operation under varying normal loading conditions. More conventionally, the input inductors TX7–TX9 perform as a buffer at the source of power represented at lines 14–16 which has a given frequency and a unique sinewave shape and associated voltage. The inductors transfer the energy of that power source into the synthesizing components of apparatus 10 without transferring the waveshape associated therewith or the voltage characteristics thereof. Line inductors or chokes as at TX7–TX9 have been described as acting as a high impedance, or spongy connection between the power line input and the regulator functions of system 10. High frequency power line phenomena such as lightning and switching transients encounter even higher impedance due to the natural frequency selective characteristics of inductors or chokes. Generally, the regulatory features of the system and apparatus 10 require, from the line source, energy within a useable band of voltage and having a frequency reference (usually 60 Hz), the regulator then functioning to follow the frequency evoked at the line power source.

The conventional components of the regulator or synthesizing network of circuit 10 are represented generally at 18 and may be observed to be comprised of six saturable reactors TX1–TX6 which, in accordance with conventional practice, operate in concert with a capacitor bank which, for the instant illustrative purpose, may be represented, inter alia, by capacitors C11–C13. In an ideal sense, the saturating reactors have the ability to change their impedance rapidly from a near open circuit to a near short circuit condition as saturation is carried out. The six reactors TX1–TX6, saturate in a sequence such that when one saturates, it drives another out of saturation. By observing that the saturation frequency rotates at line frequency, a unique pulse or pulses may be evolved from each reactor for every one-half cycle. The pulse height depends upon the characteristic of the reactor, i.e. the iron or copper in its core and consequent saturation density, while the width of these discrete pulses becomes a function of line frequency. The build-up of such pulses evolves a sinewave configuration and the pulses which form that sinewave shape are not seen at the load due to the filtering action of the capacitors operatively associated with the saturating reactors.

Of the reactors within network 18, it may be noted that saturable reactors TX4, TX5, and TX6 are coupled with respective lines 20–22 directly to capacitors C11–C13. These reactors are configured as saturating reactors with a single secondary or choke configuration and, additionally, are coupled through respective lines 24–26 to reactors TX1, TX2, and TX3. The latter reactors are shown wired as transformers and are interconnected in zig-zag fashion. This is one of several saturating core interconnections that may function with the apparatus 10 and it may be noted further that reactors TX1–TX3 are coupled in series with reactors TX4–TX6.

Looking to the connection of the saturating reactor network TX1–TX6 with capacitor bank C11–C13, it may be observed that such connection is a direct one through lines 20–22 and that the capacitors are associated with the latter lines in a delta formation structured by lines 28–30. A Wye connection also will function for the interconection of capacitors C11–C13. Thus associated with the reactor function of network 18, these capacitors serve as storage elements to maintain the reactors TX1–TX6 in oscillation, the reactors saturating and ringing with the capacitors to provide this function.

The insertion of energy from the input side 12 of the apparatus 10 is provided by an off-set arrangement accomplished by magnetic flux transfer. More particularly, energy is inserted into saturable reactors TX1–TX6 in magnetic fashion by corresponding primary windings TX1'–TX6' connected in series with the outputs of respective input chokes TX7–TX9. FIG. 1 reveals that the output side of input choke TX7 is coupled through line 32 to primary winding TX4' which is associated with reactor TX4, as well as primary winding TX1' which, in turn is associated with reactor TX1. Similarly, the output of input inductor TX8 is coupled through line 33 in series with primary winding TX5' associated with reactor TX5, as well as to primary winding TX2' which is associated with reactor TX2. In like manner, the output of input inductor or choke TX9 is present at line 34 which is coupled in series with primary winding TX6' which is operatively associated with reactor TX6 and with primary winding TX3', the latter being operatively associated in primary winding fashion with reactor TX3. Windings TX1'–TX3' are interconnected in the earlier-described zig-zag configuration. Faraday shields 36–38 are shown associated with the cores of respective windings TX4'–TX6', while similar Faraday shields 40–42 are associated with the cores of primary windings TX1'–TX3'. These Faraday shields are shown coupled to a conventional ground or neutral position generally provided as a main ground busbar as represented at 44. The Faraday shields extend between primary and secondary windings and are connected to ground to lower interwinding capacitance and thus prevent the transfer of common mode line noise therebetween.

As a result of the utilization of an approach wherein magnetic energy is coupled from the primary windings TX1'–TX6' to the corresponding saturable reactor secondary windings TX1–TX6, a desired offsetting or isolation of the saturable reaction function 18 is achieved. Additionally, a series coupling is evolved which serves to improve performance of the overall device, inasmuch as it prevents the pass-through of common mode noise. Further, the coupling technique is found helpful in stepping up or stepping down voltage and avoids dangerous voltage excursions in the event of catastrophic failure occasioned through broken wires or the like. Where such breakage occurs, the energy source is removed from the system to avoid damage. However, for performance in accordance with the invention, the step down function may be located in a circuit sense, downstream or upstream from the input inductors TX7–TX9 to achieve acceptable performance.

As described in the above-noted application for U.S. Pat. No. 4,544,877, significant improvements in the efficiency of operation of the apparatus 10 can be achieved by controlling the processed KVA that the regulators of network 18 experience for any given amount of actual through-put energy. This reduction is carried out by electing to position a predetermined amount of the capacitance otherwise provided from capacitors C11-C13 at the isolated primary winding input stages of the apparatus 10, but electrically downstream of the input inductors TX7-TX9. In the practical construct of the circuit represented by FIG. 1, these resonant circuit capacitors are provided from a bank incorporating a parallel coupled plurality thereof. By connecting a certain ratio of the capacitive value from this bank of capacitors to the primary side of the system, an important efficiency improvement is achieved. FIG. 1 shows the location of capacitance value at the primary input side of the system as capacitors C41-C43, respectively connected within lines 46-48. Lines 46-48 are arranged to interconnect the capacitors represented at C41-C43 in delta configuration and the connection thereof with the primary windings is provided by the coupling of lines 48 and 46 through line 50 to input line 32; by the coupling of lines 47 and 48 through 51 to input line 34; and by the coupling of line 46 and 47 through line 52 to input line 33. Thus, the pulse saturation of the saturable regulator windings TX1-TX6 is carried out in conjunction with two banks of capacitors separated between the secondary windings TX1-TX6 and the primary windings TX1'-TX6'.

When operated in accordance with the structure thus far described, in combination with an arrangement defining a neutral, the apparatus 10 provides a stable, high quality three-phase sinusoidal output at lines 54-56 which extend to respective terminals 59-61, in turn, being labelled X, Y, and Z. A neutral terminal will be seen to be developed at line 57 extending to terminal 62 and labelled, N. While such output is generally stable and of high quality, as described in the noted U.S. Pat. No. 4,305,033, the system, on certain rarely occuring occasions, will react to transient phenomena in a manner wherein it will assume a non-sinusoidal stable output state. The noted patent describes the discovery of the causes of these transient phenomena which occasions such stable, non-sinusoidal operation, as well as the technique carried out for its prevention. Generally, it was determined that the transient phenomena encountered evidenced at least one very strong odd or even harmonic. By shorting these harmonics out at the output of the system or at any other appropriate position with tuned series traps, the unacceptable operational modes are avoided and the system achieves a desired reliability. Such trap structures serve to force energy representing unwanted harmonics back to fundamental as a form of energy reflection. While such addition of the odd and even harmonic traps permitted the development of a highly desirable and reliable synthesizer system, that system accommodates suddenly imposed loads or load transients by adjusting its phase angle output to lag the phase angle input from the utility. By such adjustment, energy can be transferred through the line chokes TX7-TX9, across the regulators and into the load. This is a characteristic of a utility interactive system.

Generally, the synthesizer performs this lag operation within about one-half cycle. However, because the synthesizers regulate volt seconds, that initial half cycle will lower in amplitude or distort in a manner found unacceptable for certain applications such as in conjunction with some X-ray devices and the like. This phase angle lag characteristic is corrected with the instant invention by employing within apparatus 10 an inductively powered rotary machine with mechanical inertia such as an inductive motor or a synchronous motor, the latter being shown in FIG. 1 at block 70. The three phase input to the stator winding of motor 70 is coupled across the output of the regulator function 18 via lines 72-74 corresponding with respective phases X, Y, Z and coupled in this regard to respective lines 20-22. Lines 72-74 additionally are shown incorporating discrete fuses as represented at fuse grouping 76. Advantageously, the motor 70 also provides the neutral terminal for the system as coupled with line 57 and extending to terminal 62. Motor 70 is operated essentially at no load and at very low current levels to interpose a "stiffness" to phase lag occasioned by load transients to the apparatus 10.

Figure 2:
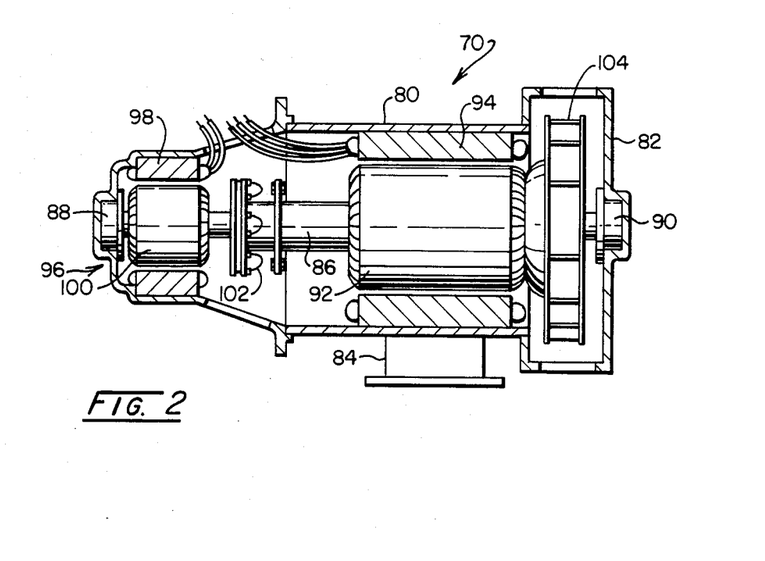
FIG. 2 is a partial sectional view of a synchronous machine which may be employed with the circuit of FIG. 1.

Referring additionally to FIG. 2, a conventional synchronous motor 70 is illustrated in partial sectional view. Motor 70 is shown having an outer supportive casing 80 which is coupled to a fan housing 82. The motor is supported from casing 80 by a stand 84 and incorpates a shaft 86 which is rotatably supported between bearings 88 and 90. In contrast to the induction motor, the polyphase synchronous motor runs at a constant speed at and load for which the torque is less than its "pullout" torque. The rotor field is produced by electro-magnets represented at 92 mounted radially on the shaft 86. Rotor 92 is shown to be rotatable within a stator 94 which, in turn, is energized from a three-phase a.c. input. The field produced by rotor 92 is produced by the direct current excitation of the electro-magnets mounted thereon and this direct current is generated by an exciter shown generally at 96 which includes a d.c. (exciter) current driven stator winding 98 and a rotor 100 mounted on the common shaft 86. The exciter or generator 100 produces an a.c. output which is rectified by a full wave bridge rectifier 102 which also is mounted for rotation with shaft 86. With this arrangement, no slip rings or the like are required to develop the necessary d.c. excitation providing the field for rotor 92.

To start the motor 70, it must be driven to some speed within, for example, about 5 percent of synchronous speed before the revolving-field structure is magnetized. When the field is then magnetized, it pulls into synchronism with the rotating field produced by the stator winding 94, and the original driving torque may be discontinued. Generally, for starting, the rectifier 102 is shorted by a circuit mounted therewith and the rotor 92 is provided with a squirrel-cage winding similar to that of an induction motor which is called an amortisseur winding. Accordingly, after the rotor 92 has attained near synchronous speed by amortisseur-winding drive, the field structure is excited by direct current and the rotor locks with the rotating field of the stator. Motor 70 is shown having essentially no loading with the excepton of a fan vane assembly 104 which advantageously is utilized for the purpose of circulating cooling air through the apparatus 10.

Figure 3:
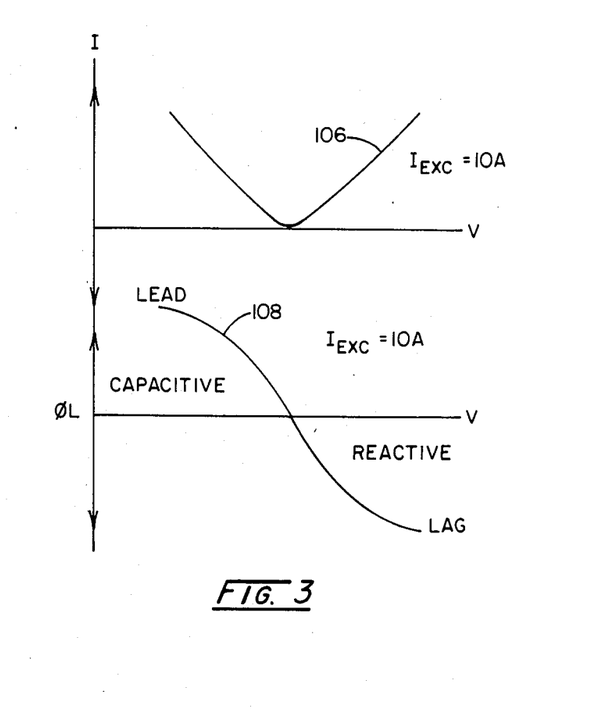
FIG. 3 shows paired voltage-current and phase-voltage diagrams disclosing aspects of the operation of the motor of FIG. 2.

For a given excitation current, for example 10 amperes d.c., the motor 70 will perform in the general manner represented by the current-voltage curve 106 shown in FIG. 3. Referring to that figure, it may be observed that where minimal loads are imposed, as is the case at hand wherein a fan and frictional aspects are the only loads involved, the motor will perform essentially at the lowermost point of curve 106. At this position, very little power is drawn and, as shown in related phase angle curve 108, essentially no reactive current is supplied, the back voltage of the device 70 being matched to driving voltage and only losses being supplied. However, should a sudden load be imposed upon the apparatus 10 and it commences to lag with respect to utility input, the rotational momentum of motor 70 will effect the appearance of a lead condition such that it will supply requisite transient energy. Alternately, the synchronous motor 70 may absorb spurious energy. Thus, any sudden shift of phase angle otherwise produced by the apparatus 10 is significantly slowed as the motor 70 is utilized only for its control over rapid transient characteristics which may be encountered in the system.

While sophisticated control circuits may be evolved for developing the excitation current to the field winding of rotor 92 to adjust performance of motor 70 with respect to transients, it has been determined that a quite simple control is all that is required. Returning to FIG. 1, this control is revealed generally at 110 and is shown to comprise a step-down transformer 112, the input to which is provided from the X-phase output line 54 and the neutral output earlier described at line 57. The X-phase input to the transformer 112 is derived from lines 114, 72, and 120, while the neutral input is derived from line 116. This stepped-down output of the regulator components 18 is then rectified by a full wave bridge rectifier 118 via coupling with the secondary of transformer 112 through lines 120 and 121. The resultant output of the bridge 118 is provided at lines 122 and 123 which extend to the exciter 96 of motor 70. A capacitor 124 is positioned intermediate lines 122 and 123 for conventional filtering purposes.

Where a motor as at 70 is employed to provide stability against sudden load surges, it has been found that the utilization of an even harmonic trap, for example, a second harmonic trap, heretofore employed in synthesizers is no longer required. The even harmonic traps serve to guarantee freedom from non-sinusoidal performance modes occasioned by transient phenomena occurring during start-up. However, the synchronous motor 70 appears as a heavy load. When the systems 10 are started with a very heavy load, they will always assume a proper stable sinusoid output. Thus, the second harmonic or even harmonic trap network as described in conjunction with the earlier-noted U.S. Pat. No. 4,305,033 is eliminated.

Apparatus 10 does, however, employ an odd harmonic trap, for example a trap to the third harmonic. Experience with the instant system shows that without such a trap structure, load-generated transient phenomena exhibiting third harmonic energy may cause the system to enter a non-sinusoidal output mode. The odd harmonic trap structure is particularly important to the systems on the occasion of single phasing conditions. When dealing with such highly unbalanced conditions, it is important that the regulators 18 continue to generate three sinusoid outputs positioned 120° apart. The odd harmonic traps contribute importantly to that performance capability. It should be pointed out, however, that the utilization of the odd trap such as a trap to the third harmonic is not necessary to achieve a proper sinusoid in the normal course of operation. The trap addition functions only on the occasion of an extreme unbalance or unusual load transient condition.

FIG. 1 shows the odd harmonic trap as having a delta configuration and is formed as capacitor C31 in line 126 combined with reactor TX14 in line 127. The next leg of the trap is formed of capacitor C32 within line 128 and reactor T15 in line 129, while the third leg of the delta configuration is comprised of capacitor C33 within line 130 performing in conjunction with reactor TX16 positioned within line 131. It may be further observed that each of lines 127, 129, and 131 are coupled in common to line 132 which extends to the neutral terminal established by synchronous motor 70.

The starting arrangement for the motor 70 is one which serves to short the field windings of the main rotor 92 until such time as the motor achieves synchronous speed. In this regard, the earlier-noted rectifier 102 is one which utilizes six diodes to accommodate the three phases involved. Looking to FIG. 4, a starting circuit which may be utilized is revealed generally at 140. One of the field windings of rotor 92 is revealed at 94 in conjunction with a representation of the six diodes of the rectifier 102. In effect, the diodes represented at 102 serve to short the input to the field winding 94 in one direction and the circuit 140 then serves to temporarily short it in both directions.

Figure 4:
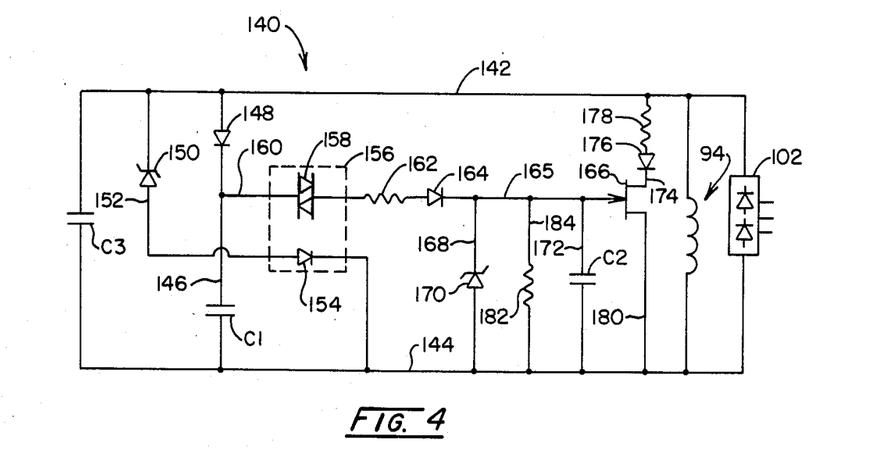
FIG. 4 is a schematic circuit diagram of a starting circuit which may be employed with the motor of FIG. 2.

Whenever motor 70 is not operating in appropriate synchronization, either at start-up or the consequence of pole slippage due to temporary power outage, a relatively high voltage will be experienced at the field winding 94. That high voltage is exhibited across lines 142 and 144 of the circuit 140. At this high voltage excursion exceeds a threshold above the normal field excitation levels, it will rapidly charge a capacitor C1 within line 146 through a diode 148. Note that line 146 extends between lines 142 and 144. As the voltage exceeds a threshold determined to be above the field excitation voltages, Zener diode 150 conducts to, in turn, excite a light emitting diode 154 and turn on optically coupled photoresponsive diode components 158. Components 158 are positioned within line 160 which, in turn, is coupled with line 146. Thus, their actuation permits the discharge of capacitor C1 through resistor 162 and diode 164. Line 160 extends to the gate electrode of a MOS field effect transistor 166 (MOSFET) as well as through line 168 to Zener diode 170 and through line 172 to capacitor C2. Zener diode 170 limits the voltage level at line 165 to, for example, 16 volts and the resultant voltage level resulting from the discharge of capacitor C1 serves to rapidly charge capacitor C2. Thus charged, capacitor C2 serves to hold MOSFET 166 in a conductive state. In the latter regard, MOSFET 166 is coupled through line 174 and line 142 and the latter line includes diode 176 and resistor 178. The opposite terminal of MOSFET 166 is coupled through line 180 to line 144. Capacitor C2 is coupled in R.C. network fashion with resistor 182 within line 184. Thus, following its being charged as a result of a high voltage detection across lines 142 and 144, capacitor C2 will gradually discharge through resistor 182 to a level effecting the turning off of transistor 166 following a predetermined interval. This interval may, for example, be selected for the instant purposes as relatively short for example 2 to 5 seconds. This short interval is available, inasmuch as motor 70 has little load on it other than the fan and frictional losses. Thus, it is capable of reaching synchronous speed in a very short period. A third capacitor, C3, is positioned between lines 142 and 144 and serves the function of protecting the transistors 166 from dv/dt excursions or spike phenomena.

The subsidiary air circulation or cooling function carried out by the fan driven by motor 70 is provided in conjunction with the packaging or mounting structure associated with apparatus 10. Looking to FIG. 5, the general representation of such packaging is revealed. Generally, the apparatus 10 will be incorporated within an upstanding frame having vertical support components as shown at 182 as well as top supporting members as at 184 and lower frame members 186. The frames support not only the electrical components of the apparatus 10 but also enclosing walls (not shown) and the entire assembly is maneuverable by virtue of its mounting on casters as are represented at 188. In the arrangement shown, the line chokes TX7-TX9 are mounted upon a lower frame labelled. Similarly, the regulator transformers TX1-TX3 are mounted above the line chokes as shown, while the corresponding regulators TX4-TX6 are mounted above transformers TX1-TX3. The capacitor banks for the apparatus 10 are shown suspended from an upper frame component as represented generally at 190. Motor 70 is mounted upon a platform shown at 192 and the fan vane components thereof are shown positioned within a muffled duct 194 which extends to an air outlet at the top of the entire cabinet assemblage. When motor 70 is operating, air is drawn through the exposed portion of the motor and expelled from the vanes of the fan 104 for appropriate exiting at the top of the assembly. The input of air is provided at an intake muffler 194 at the top of the cabinet. Circulating air thus brought into the assemblage is ducted to the bottom thereof by a sound protected duct (not shown).

Figure 5:
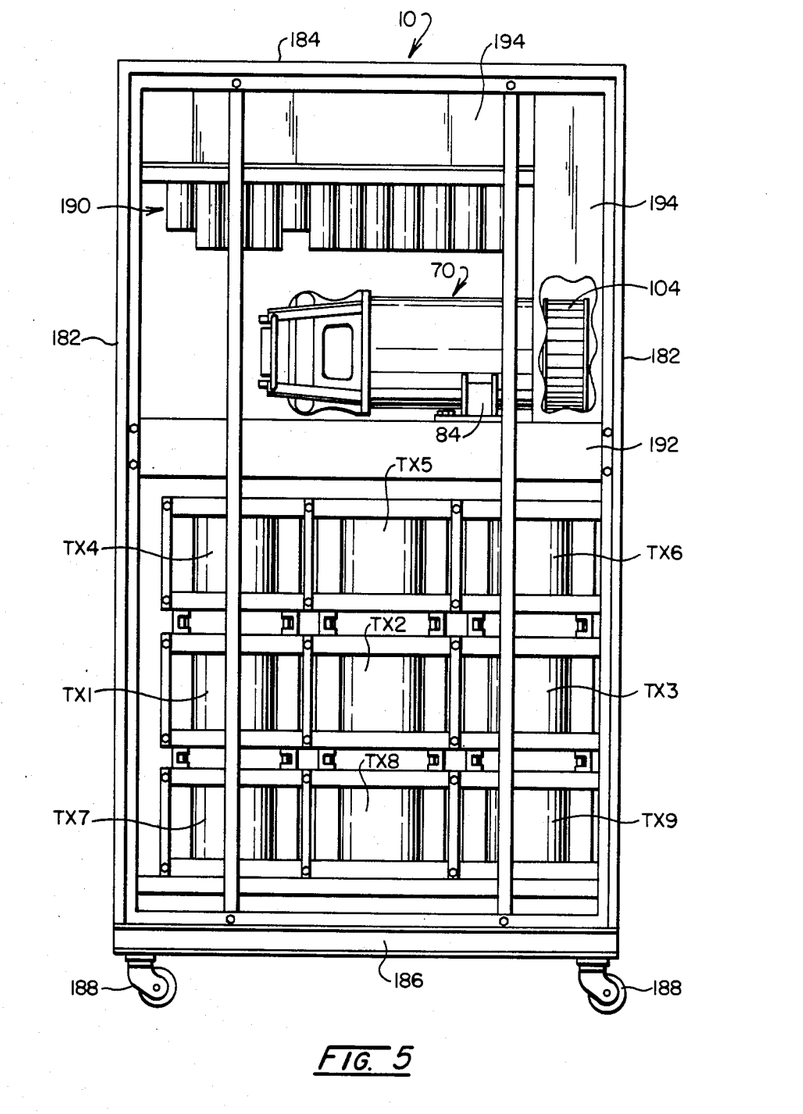
FIG. 5 is a side view of a structure for retaining the circuit components of FIG. 1 with portions broken away and/or removed to reveal internal structure.

Tests were carried out for the purpose of evaluating the apparatus constructed in accordance with the teachings set forth above in conjunction with FIGS. 1, 4, and 5. Exemplary of this testing are the curve sets shown in conjunction with FIGS. 6-9. In carrying out the tests, a 50 KVA/50 KW system was employed in conjunction with a 50 KVA/40 KW synchronous machine marketed by Marathon Corporation of Milwaukee, Wis. The testing implements which were employed are represented in dotted line fashion in FIG. 1. Looking to that figure, it may be observed that a steady state load was provided which was comprised of resistors R1, R2, and R3 which were coupled in a Delta configuration at the output terminals 59-61 which additionally, are shown labelled respectively, X, Y, and Z. Resistors R1-R3 constituted a steady-state load and were selected having relatively low resistance values. To provide a surging upon the system, a parallel arrangement of relatively higher resistance value resistors R4-R6 was coupled between the respective X, Y and Z terminals and with neutral, N, terminal 62 via line 200, i.e. the surge resistor load was coupled phase to neutral. To suddenly impose the surge load represented by resistors R4-R6, a grouping of switches represented schematically at S1 was provided. These switches were implemented by SCRs controlled by a test circuit represented at block 202 and dashed line 204. Upon the sudden application of surge resistors R4-R6 to the system, a signal also was provided from control 202 as represented by line 206 to a read-out device represented at block 208. Block 208 was provided as a T. G. Brandon "Smart-Scope" which served to provide a read-out of select phase-to-phase and phase-to-neutral voltages. In this regard, the X-Y voltages were monitored as represented at step-down transformer block 210 ($V_oXY$); the X-Z voltages were monitored as represented by step-down transformer block 212 ($V_oXZ$); and the Y-Z voltages were monitored as represented by step-down transformer block 214 ($V_oYZ$). For certain of the tests the transformers represented at blocks 210, 212 and 214 were connected in phase-to-neutral fashion. Output current was monitored at the X phase line 59 by a current tap as represented at block 216 and the output thereof was directed to the read-out device 208 as represented at dashed line 218.

Figure 6:
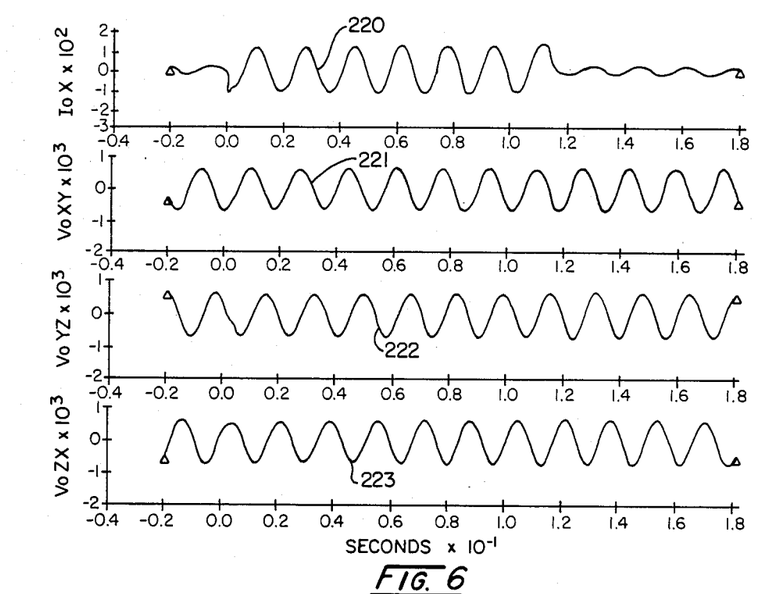
FIG. 6 shows a combination of related output current and phase-to-phase voltage curves developed in testing apparatus according to FIG. 1.

Looking to FIG. 6, the output of read-out device 208 is represented for the application of surge loads R4-R6 by the actuation of switch S1. This actuation is shown to take place at time 0.0 with respect to the curves plotted by output device 208. Output current $I_oX$ at line 59 shows an initial surge during the first half cycle to a value of about 73.123 amperes which later reaches peak values of 81.96 amps. The surge load is shown to be applied from time 0.0 for an interval of about 0.11 seconds. Performance of the apparatus 10 under this surging may be observed at curves 221-223. Looking to curve 221, the x to y voltage reading, $V_oXY$ shows that less than about a 7% sag was experienced in the first three half cycles. This was computed by determining the ratio of the first sag value of 445.8 volts with respect to the overall average amplitude of 478.5 volts. For the YZ phase load ($V_oYZ$) as shown at curve 222, the initial sag of 437.9 volts was compared with the overall average amplitude of 477.4 volts to show about a 9% sag. Similarly, the same relationships were taken for the ZX load ($V_oZX$) and the half cycle amplitude of 430.9 volts was compared with the overall amplitude average of 477.9 showing about a 10% sag. All of the sag values fall well within the requirements of the system.

Figure 7:
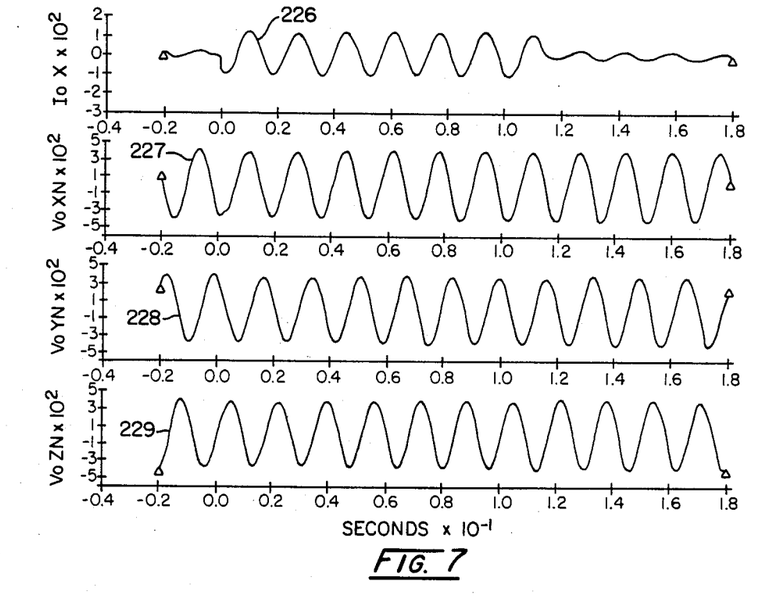
FIG. 7 is a grouping of related output current and phase-to-neutral voltage curves developed in conjunction with the testing of the apparatus of FIG. 1.

Looking to FIG. 7, a similar test was carried out, however, the output of readout 208 represents phase-to-neutral couplings of the step down monitoring transformers as represented at blocks 210, 212, and 214. In the figure, curve 226, representing the current levels at the X phase output line 54 showed a surge of 65.5 amps, RMS, in the first half cycle following the application of surge load at time 0.0. The curve shows, as before, that the surge load was applied for about 0.11 seconds. Curve 227, showing the voltage levels from X phase to neutral ($V_oXN$) exhibited a surge of 260.9 volts which, when compared to an RMS average amplitude of 284.5 represented an 8.3% sag representing an acceptable valuation. Similarly, the Y to neutral phase ($V_oYN$) showed a first half cycle sag value at 265.6 volts which, when compared to the average RMS amplitude value for the test of 283.1 volts represented about a 6% sag, again a value found to be acceptable. Finally, the Z to neutral ($V_oZN$) performance is shown at curve 229 which revealed an initial half cycle sag to 263.2 volts. When compared to the RMS average amplitude for the test of 284.0 volts, about a 7.3% sag is seen to have been experienced. All of the above sag values fall within readily acceptable ranges.

Figure 8:
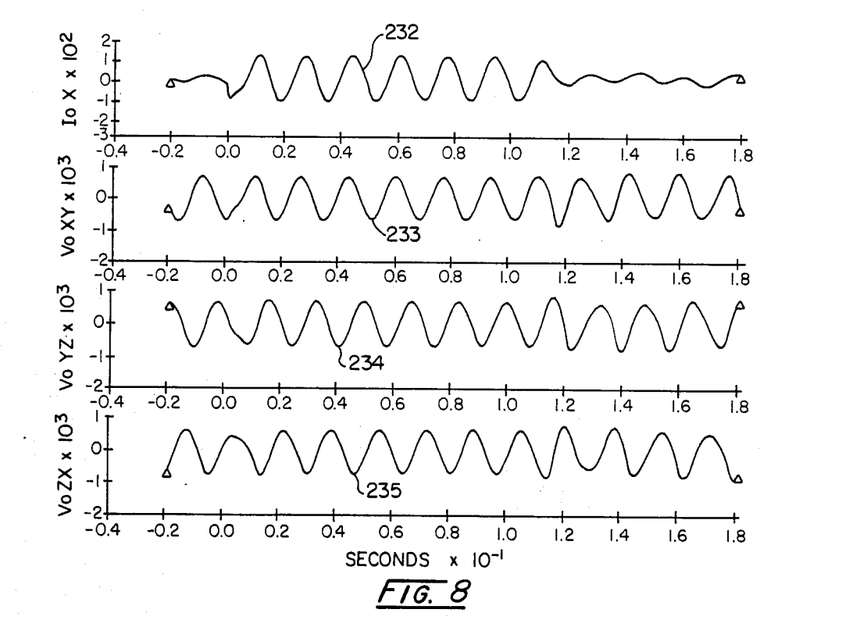
FIG. 8 is a grouping of related output currrent and phase-to-phase voltage curves developed in testing a synthesizer device without the improvements of the instant invention.

Referring to FIG. 8, the readout of device 208 is presented for a test wherein the synchronous motor 70 was removed from the apparatus 10 and a compensating second harmonic trap as described in conjunction with U.S. Pat. No. 4,305,033 was not provided.

The monitoring of X phase current line 54 ($I_oX$) is shown at curve 232 wherein an initial half cycle surge of about 58 amps was experienced from an initial value of about 14 amps. The X to Y phase readout is shown at curve 233 which revealed an initial half cycle sag of 438.4 volts which, when compared to an RMS overall amplitude value of 494.9 volts shows about an 11% sag. In similar fashion, the Y to Z phase readout ($V_oYZ$) shows an initial half cycle sag of 405.7 volts as compared to an RMS overall amplitude value of 490.5 to represent about 13% sag. Finally, the Z to X phase readout ($V_oZX$) shows an initial half cycle sag to 390.9 volts as compared to an RMS overall amplitude value of 490.3 volts representing about a 20% sag. Following these initial sags, the apparatus tended to "overshoot" for example to amplitude peak values of over 500 volts as a compensation form of performance. Once this initial surge was experienced, the system commenced to decay downwardly and the distortion of the output for each of the curves 233–235 becomes quite evident.

Figure 9:
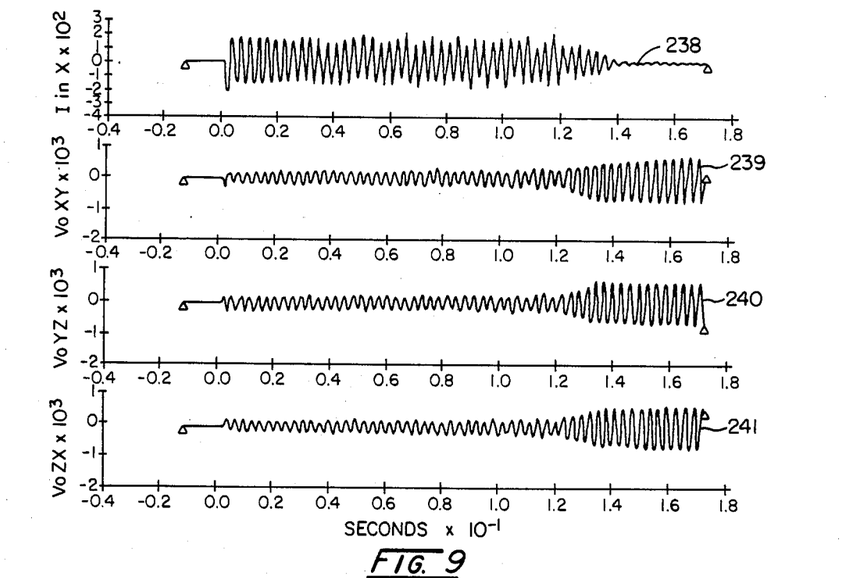
FIG. 9 is a grouping of input current and related phase-to-phase voltage output curves demonstrating the start-up aspects of the instant invention.

Referring to FIG. 9, the readouts obtained from device 208 in a phase-to-phase voltage monitoring connection as well as in conjunction with a current monitoring as shown at block 216 but in conjunction with the X phase input at terminal 14 is revealed at curves 238–241. These curves reflect the performance of the system when utilizing the start-up circuit of FIG. 4. X phase input current (IinX) is revealed at line 238 as being of relatively high, for example, about 200 amps peak-to-peak. This relatively high amperage value reveals that the synchronous motor 70 is demanding current, however, as revealed at curves 239–241 showing, respectively, the X to Y phase ($V_oXY$), the X to Z phase ($V_oYZ$), and the Z to X phase ($V_oXZ$) voltage values are very low, being around the peak-to-peak values of 130 volts as compared to a nominal 480 volt value. As the synchronous motor 70 begins to reach synchronous speed, for example, at about 0.14 seconds, the peak voltages at curves 239–241 commence to expand to nominal values. It may be observed that there are no transients during this start-up, representing a highly desirable performance. It may be noted that, as the motor 70 reaches synchronous speed, the current as represented at curve 238 diminishes for this typical no-load start-up procedure.

Figure 10:
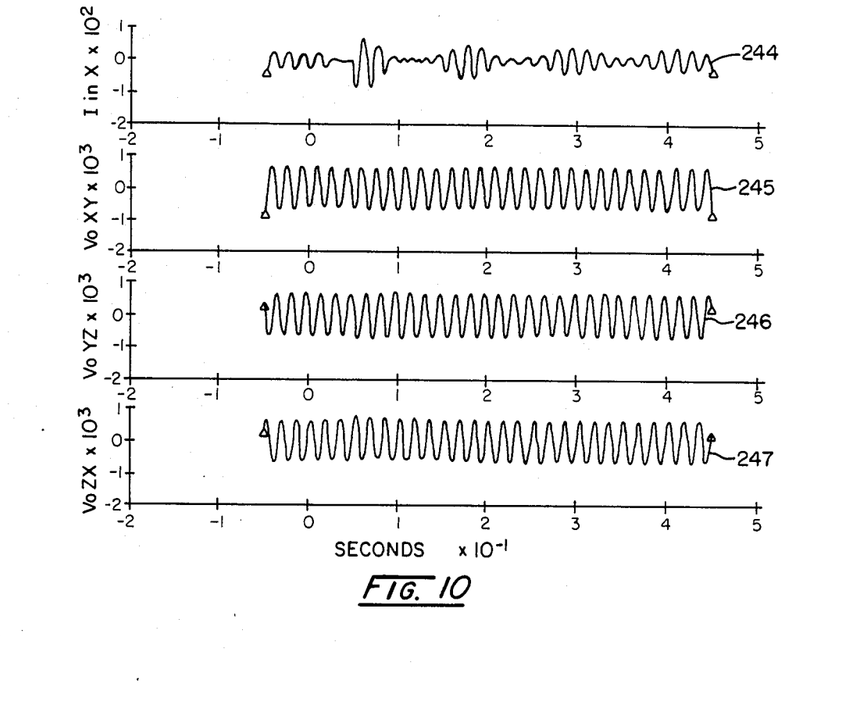
FIG. 10 is a grouping of related input current and phase-to-phase voltage curves showing the effect of a loss of power input to the apparatus of FIG. 1.

Referring to FIG. 10, the performance of apparatus 10 as recorded by readout device 208 coupled in a phase-to-phase arrangement, as above described, and in conjunction with the monitoring of input current at terminal 14 for the X phase is revealed in conjunction with curves 244–247. For the test carried out, a steady-state 15 KW load was imposed and the input current was turned off for an interval of about 100 milliseconds, as represented at time 0. Curves 245–247 reveal that the momentum of the synchronous motor 70 is seen by to have evoked a generator type performance, a decaying but still sinusoidal output being revealed in the curves.

Figure 11:
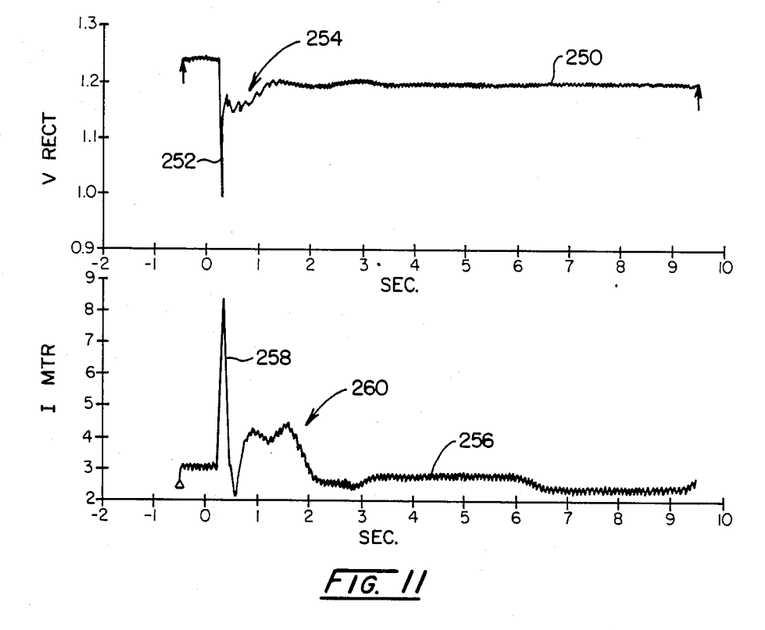
FIG. 11 is a grouping of related synthesizer rectified peak output voltages and motor stator current output showing the performance of the system when the rotary machine used with the invention employs no excitation current.

Referring to FIG. 11, traces are revealed showing the results of experimentation with the apparatus of the invention. For the testing revealed by the traces of the figure, sudden loads were imposed upon the system by resistive switching as revealed in FIG. 1 and described above. However, the three-phase output of the system was directed through a three-phase, six diode bridge so as to be, in effect, peak rectified as represented at curve or tract 250. The latter trace was provided by the "Smartscope" as described in conjunction with block 208 in FIG. 1. No excitation current was supplied to the synchronous motor 70 employed with the test. Thus, the rotary device 70 performed essentially as an induction motor. The sudden and sharp peak 252 of curve 250 was created upon the sudden imposition of resistive load. That region of the curve shown in general at 254 indicates a very rapid recovery from the suddenly imposed load indicating a very good transient response for the system. In effect, the motor has become a generator to supply energy essentially immediately to effect a recovery which the synthesizer components of the system otherwise would accommodate through a lagging phase relationship with the incoming power supply.

Curve 256 shows the current at the stator of the motor 70 which, as noted above, is operating without excitation input. The rising peak at 258 for trace 256 shows that the motor 70 is immediately supplying energy to the system in response to the suddenly imposed load. This energy then is recovered by the motor on a gradual basis as represented at region 260.

Tests carried out in conjunction with FIG. 11 indicate that a broadened range of inductive rotary devices can be employed for the purpose of effecting a rapid and desired response to rapidly imposed transients or loadings. It is opined that classic inductive motors which might be employed with the system generally are designed so that they exhibit a sub-transient impedance making the motors somewhat immune to voltage sags at their inputs. However, use of such motors with the instant function may be improved by lowering that sub-transient impedance so as to use the generator effect to maximum extent.

Since certain changes may be made in the above system and apparatus without departing from the scope of the invention herein involved, it is intended that all matter contained in the above description or shown in the accompanying drawing shall be interpreted as illustrative and not in a limiting sense.

I claim:

1. Apparatus for use with an a.c. polyphase source of variable voltage level for providing a regulated a.c. output to a load, comprising:
    polyphase input choke means connectable with said a.c. source for deriving an energy input substantially immune from variations of waveshape and voltage level;
    regulator means for receiving said energy input, including polyphase saturable reactor means and polyphase capacitor means operable therewith to synthesize a polyphase sinusoidal output connectable with said load; and
    polyphase motor means having a stator coupled with said output for deriving a stator field, and a rotor, said motor means being controllable to inertially impose a phase shift stability over said sinusoidal output by deriving an inertially driven generator voltage source performance exhibiting phase lag with respect to said a.c. polyphase source in the presence of short duration load transients; and
    control means for effecting said motor means control for operation continuously at minimum level power input.

2. The apparatus of claim 1 in which said polyphase motor means exhbits minimal subtransient impedance.

3. The apparatus of claim 1 including filter means coupled with said regulator means at a location affecting said output for suppressing the generation of odd harmonic content therein.

4. The apparatus of claim 3 in which said filter means comprises a series tuned capacitor and reactor network configured to return any third harmonic energy of said output to fundamental.

5. The apparatus of claim 1 including isolation means having an isolation winding inductively isolated from said regulator means for isolating said source from said load.

6. The apparatus of claim 5 in which said isolation means comprises:
primary winding means coupled with said input choke means for effecting energy transfer; and
said regulator means saturable reactor means are inductively coupled with said primary winding means.

7. The apparatus of claim 1 in which said input choke means is configured having a non-linear impedance characteristic.

8. The apparatus of claim 1 including fan means for circulating air through said apparatus coupled in driven relationship with said motor means.

9. In regulator apparatus of the type wherein polyphase input chokes having non-linear impedance characteristics transfer energy from an a.c. source of variable voltage level and waveshape to a regulator including polyphase saturable reactors operating in conjunction with polyphase capacitors to synthesize a polyphase sinusoidal output, the improvement for inertially imposing a phase shift stability over said sinusoidal output, comprising:
polyphase synchronous motor means having a stator coupled with said output for deriving a stator field, a rotor excitable by a select excitation current to derive a rotor field and starting circuit means actuable for deactivating said rotor field, said motor means having an output carrying substantially no load and deriving an inertially driven generator voltage source performance in the presence of short duration load transients; and
control means for providing said excitation current at a minimum level selected for substantially equating the driving voltage of said motor means with the back voltage thereof.

10. The regulator apparatus of claim 9 including filter means coupled with said regulator means at a location affecting said output for suppressing the generation of odd harmonic content therein.

11. The regulator apparatus of claim 10 in which said filter means comprises a series tuned capacitor and reactor network configured to return any third harmonic energy of said output to fundamental.

12. The apparatus of claim 9 in which said control means comprises:
a step-down transformer coupled with said output to provide an exciter input having voltage level values proportionate with said output;
means for rectifying said exciter input to provide a rectified exciter input; and
means for deriving said excitation current from said rectified exciter input.

13. A system for conditioning an a.c. source of power for providing a regulated a.c. output to a load, comprising:
a component support housing;
polyphase input inductor means mounted within said support housing connectable with said a.c. source for deriving an energy input;
regulator means mounted within said support housing for receiving said energy input, including polyphase saturable reactor means and polyphase capacitor means operable therewith to synthesize a polyphase sinusoidal output connectable with said load;
polyphase motor means mounted within said support housing having a stator coupled with said output and a rotor, said motor having an output carrying substantially no load and being controllable to inertially impose a phase shift stability over said sinusoidal output deriving an inertially driven generator voltage source performance in the presence of short duration load transients;
control means for controlling the rotational speed of said motor means for operation continuously at minimum level power input; and
filter network means mounted within said housing and coupled with said regulator means for suppressing the generation of odd harmonics induced therein.

14. The system of claim 13 which said filter network means comprises a series tuned capacitor and reactor network configured to return any third harmonic energy to fundamental.

15. The system of claim 13 including:
duct means within said support housing for directing driven cooling air to the components mounted therein; and
fan means for driving said cooling air through said duct means, coupled in driven relationship with said motor means output.

16. The apparatus of claim 13 in which said polyphase motor means is a synchronous motor and said rotor thereof is excitable by a select excitation current to derive a rotor field, including starting circuit means actuable for deactivating said rotor field, and said control means derives said excitation current at a minimum level selected for substantially equating the driving voltage of said motor means with the back voltage thereof.

17. The apparatus of claim 13 in which said control means comprises:
a step-down transformer coupled with said output to provide an exciter input having voltage level values proportionate with said output;
means for rectifying said exciter input to provide a rectified exciter input; and
means for deriving said excitation current from said rectified exciter input.

18. The system of claim 17 including:
duct means within said support housing for directing driven cooling air to the components mounted therein; and
fan means for driving said cooling air through said duct means, coupled in driven relationship with said synchronous motor means output.

19. The system of claim 18 in which said filter network means comprises a series tuned capacitor and reactor network configured to return any third harmonic energy to fundamental.

20. Apparatus for use with an a.c. polyphase source of variable voltage level for providing a regulated a.c. output to a load, comprising:
polyphase input choke means connectable with said a.c. source for deriving an energy input substantially immune from variations of waveshape and voltage level;
regulator means for receiving said energy input, including polyphase saturable reactor means and polyphase capacitor means operable therewith to synthesize a polyphase sinusoidal output connectable with said load; and polyphase synchronous motor means having a stator coupled with said output for deriving a stator field, a rotor excitable by an excitation current to derive a rotor field, said motor means deriving an inertially driven generator voltage source performance in the presence of short duration load transients; and control means for deriving said excitation current at a minimum level selected for substantially equating the driving voltage of said motor means with the back voltage thereof.

21. The apparatus of claim 20 in which said control means comprises:
 a step-down transformer coupled with said output to provide an exciter input having voltage level values proportionate with said output;
 means for rectifying said exciter input to provide a rectified exciter input; and
 means for deriving said excitation current from said rectified exciter input.

* * * * *